(12) United States Patent
Asada et al.

(10) Patent No.: US 8,110,062 B2
(45) Date of Patent: Feb. 7, 2012

(54) WELDING METHOD AND WELDING APPARATUS FOR RESIN MEMBER

(75) Inventors: Shinsuke Asada, Tokyo (JP); Takafumi Hara, Tokyo (JP); Seizo Fujimoto, Tokyo (JP); Masaaki Taruya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 973 days.

(21) Appl. No.: 12/100,086

(22) Filed: Apr. 9, 2008

(65) Prior Publication Data
US 2009/0126869 A1 May 21, 2009

(30) Foreign Application Priority Data
Nov. 19, 2007 (JP) .................................. 2007-299427

(51) Int. Cl.
*B32B 37/06* (2006.01)
(52) U.S. Cl. .................................. 156/272.8; 156/380.9
(58) Field of Classification Search ............... 156/272.2, 156/272.8, 64, 352, 378, 379.6, 380.9
See application file for complete search history.

(56) References Cited

U.S. PATENT DOCUMENTS

| 4,636,609 A | 1/1987 | Nakamata |
| 6,329,629 B1 * | 12/2001 | Grewell .................. 219/121.61 |
| 6,411,759 B1 * | 6/2002 | Beguin et al. .................. 385/49 |

FOREIGN PATENT DOCUMENTS

| JP | 03-183527 A | 8/1991 |
| JP | 05-177711 A | 7/1993 |
| JP | 2002028983 A | 1/2002 |
| JP | 2002-337236 A | 11/2002 |
| JP | 2002337236 A | * 11/2002 |
| WO | 01-83145 A2 | 11/2001 |

OTHER PUBLICATIONS

Machine Translation of JP 2002337236 A, (Nov. 27, 2002).*
Japanese Office Action, corresponding Japanese Application No. 2007-299427, dated Dec. 15, 2009.

* cited by examiner

*Primary Examiner* — Richard Crispino
*Assistant Examiner* — Daniel McNally
(74) *Attorney, Agent, or Firm* — Sughrue Mion, PLLC (57) ABSTRACT

A welding method and welding apparatus for resin members is provided in which dimensional accuracy of two resin members after welding can be secured and reduction in joining strength due to excessive laser irradiation can be prevented. In a method of superimposing a resin having a laser-transmitting property and a resin having laser absorptiveness and irradiating the resin members with a laser beam from the side of the laser-transmitting resin member to deposit the resin members on each other, irradiation with the laser beam is ended in accordance with reduction in the approaching speed of the two resin members during the irradiation with the laser beam.

8 Claims, 9 Drawing Sheets

WELDING METHOD AND WELDING APPARATUS FOR RESIN MEMBER

BACKGROUND OF THE INVENTION

1. Field of the Invention

The present invention relates to a welding method and welding apparatus for joining a resin member having a laser-transmitting property and a resin member having laser absorptiveness, by using a laser beam.

2. Description of the Related Art

A technique of superimposing a resin member having a transmitting property with respect to a laser beam of a predetermined wavelength and a resin member having absorptiveness with respect to a laser beam of the same wavelength and casting a laser beam from the side of the laser-transmitting resin member to deposit the two resin members, is well known as described in JP-A-2002-337236 and so on.

This technique will now be briefly described. The laser beam passes through the laser-transmitting resin almost without being absorbed at all and is absorbed in the vicinity of the surface of the laser-absorptive resin member. The energy of the absorbed laser beam is converted to heat, which heats the surface of the laser-absorptive resin member. Also the vicinity of the surface of the resin of the laser-transmitting member resin in contact with the surface of the laser-absorptive resin is heated by heat transfer. As a result, a melted layer is formed on the contact surface between the laser-transmitting resin member and the laser-absorptive resin member, and the two resin members are welded. In the welding, in order to secure adhesion of the laser-transmitting resin member and the laser-absorptive resin member, a load is applied in the direction of the superimposition and the laser beam is cast in a state where the resin members are pressurized on the welding surface. Therefore, a part of the melted layer is discharged outward and the welded members approach each other more closely than before the welding.

In the traditional laser welding method, the approaching distance of the two resin members varies with respect to the irradiation time of a predetermined laser beam. Therefore, the dimensional accuracy of the welded unit is lowered. This variance is caused by various factors. These include instability of laser power, difference in transmittance between individual laser-transmitting resins, and so on. On the other hand, the method proposed in JP-A-2002-337236 is a management method in which welding is ended when a predetermined approaching distance is reached, and therefore the variance in the approaching distance is reduced.

However, the approaching motion proceeds even during a delay time in terms of control from the time when it is detected that the predetermined approaching distance is reached until the welding is stopped. Since the approaching distance during this period varies, there still is variance in the approaching distance.

To secure the dimensional accuracy of the welded unit, it is most effective to employ a structure in which two resin members being welded are butted against each other at other parts than the welded part. If the structure is designed to realize predetermined positional accuracy at the position where the two resin members are butted against each other, the influence of variance in the approaching distance in the welding can be eliminated. Of course, in this case, the time until the two resin members are butted against each other varies among individual units. In order for resin members to be securely butted against each other in all individual units, it is necessary to set a longer laser beam casting time than a variance range. Therefore, for a unit which takes a short time for the resin members to be butted against each other, the laser beam casting time after the butting is excessively long, and a problem of lowering in the joining strength at the welded part arises. The lowering in the strength is caused by the following factors. Since the welded part is pressurized until the two resin members are butted against each other, the melted resin is sequentially discharged outward and the melted layer is prevented from being excessively heated. However, after the butting, since the butted part receives loading, the pressurizing force does not act on the welded part. Consequently, the discharge of the melted layer stops. If irradiation with the laser beam is further continued in this state, the temperature of the melted layer rises, which causes generation of voids and thermal decomposition. Thus, the joining strength is lowered.

SUMMARY OF THE INVENTION

It is an object of the present invention to provide an optical welding method and welding apparatus for resin member which can achieve both dimensional accuracy and welding strength of welded components.

According to an aspect of the invention, in a method of superimposing a resin member having a laser-transmitting property and a resin member having laser absorptiveness and irradiating the resin members with a laser beam from the side of the laser-transmitting resin member to deposit the resin members on each other, the irradiation with the laser beam is ended in accordance with reduction in approaching speed of the two resin members during the irradiation with the laser beam.

Also, according to another aspect of the invention, in a resin member welding apparatus, a resin member having a laser-transmitting property and a resin member having laser absorptiveness are superimposed and the resin members are irradiated with a laser beam from the side of the laser-transmitting resin member to deposit the resin members on each other. The apparatus has a speed measuring unit which measures the speed of one resin member or a holding jig holding the one resin member with respect to the other resin member during the irradiation with the laser beam, and a control unit which determines reduction in approaching speed of the two resin members in accordance with an output signal from the speed measuring unit and ends the irradiation with the laser beam.

With the resin member welding method according to the invention, dimensional accuracy of the two resin members after welding can be secured and reduction in joining strength due to excessive laser irradiation can be prevented.

Also, with the resin member welding apparatus according to the invention, a welding method which secures dimensional accuracy of the two resin members after welding and prevents reduction in joining strength due to excessive laser irradiation can be carried out.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view showing a sealed container as an example to explain an embodiment of the invention.

FIG. 5 is a sectional view showing another exemplary method of butting resin members against each other.

DETAILED DESCRIPTION OF THE PREFERRED EMBODIMENTS

First Embodiment

A method of welding two resin members to manufacture a sealed container shown in FIG. 1 will be described hereinafter as an example.

A resin member 1 is a lid which is made of a resin having a transmitting property with respect to a laser beam used for welding. Examples of its material may include polybutylene terephthalate (PBT), polyethylene terephthalate (PET), polyphenylene sulfide (PPS), polyether-etherketon (PEEK), polycarbonate (PC), polyamide (PA), polyethylene (PE) and so on. The material contains no dyes or pigments at all or is colored with a dye or pigment to an extent that does not inhibit transmittance of the wavelength of the laser beam.

A resin member 2 is a case having absorptiveness with respect to the wavelength of the laser beam used for welding. Examples of its material are similar to the transmitting resins. However, a material having lower transmittance than the transmitting resin material is selected, or a material mixed with a pigment or dye which enhances absorption such as carbon black is used.

These resin members are molded by various resin molding methods such as an injection molding method, extrusion molding method, blow molding method, and thermoforming method. A metal component, another resin component or the like may be inserted. It suffices to use a combination of the laser-transmitting resin and the laser-absorptive resin, only the parts used for welding.

Figure 2:
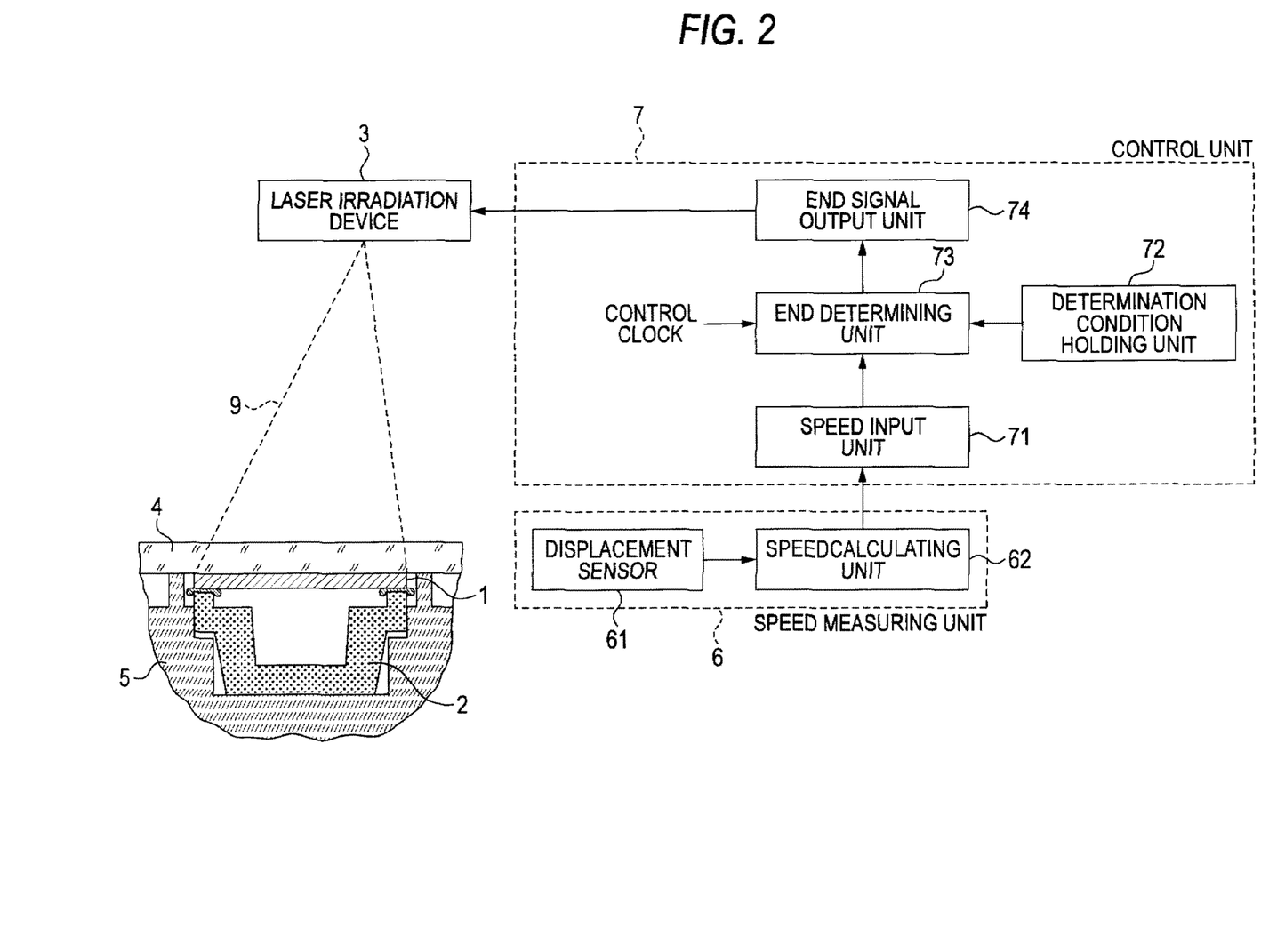
FIG. 2 shows a schematic configuration of a welding apparatus according to the first embodiment of the invention.

FIG. 2 shows a configuration of a resin member welding apparatus according to the first embodiment of the invention.

This welding apparatus has a laser irradiation device 3, holding jigs 4 and 5 which hold the resin member 1 and the resin member 2, respectively, a pressurizing device (not shown) which applies a load to a welding target via these jigs, a speed measuring unit 6 which measures the approaching speed of the resin member 1 and the resin member 2, and a control unit 7 which determines end timing of laser irradiation in accordance with a measured value from the speed measuring unit 6 and gives a laser irradiation end command to the laser irradiation device 3.

While the holding jig 5 holding the resin member 2 is fixed, the holding jig 4 holding the resin member 1 is movable in the loading direction, following the resin member 1.

The speed measuring unit 6 includes a displacement sensor 61 which detects the quantity of relative displacement between, for example, the resin member 1 and the resin member 2, the resin member 1 and the holding jig 5, the holding jig 4 and the resin member 2, or the holding jig 4 and the holding jig 5. The speed measuring unit 6 also includes a speed calculating unit 62 which calculates the approaching speed of the resin member 1 and the resin member 2, the resin member 1 and the holding jig 5, the holding jig 4 and the resin member 2, or the holding jig 4 and the holding jig 5, on the basis of the quantity of displacement measured every predetermined time period.

The control unit 7 includes a speed input unit 71 where the approaching speed measured by the speed measuring unit 6 is inputted, an end determining unit 73 which determines timing of ending laser irradiation in accordance with determination conditions held by a determination condition holding unit 72, and an end signal output unit 74 which outputs an irradiation end signal to the laser irradiation device 3. The determination operation in the end determining unit 73 is carried out at every predetermined time interval decided by a control clock.

Figure 3A:
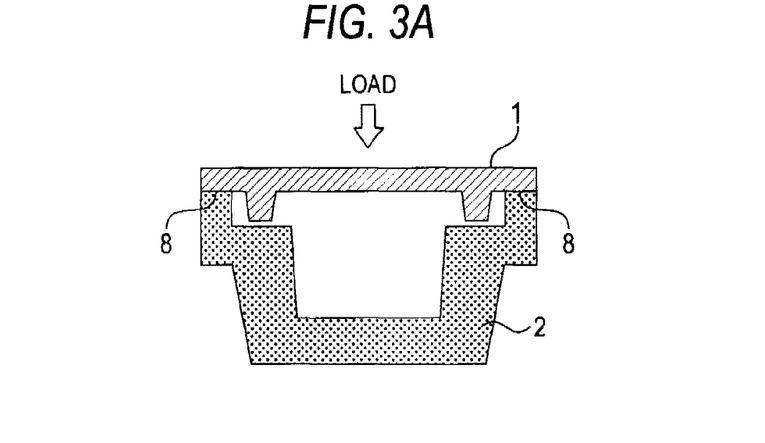
FIG. 3A to FIG. 3C are sectional views showing each step of a welding method according to the first embodiment of the invention.
Figure 3B:
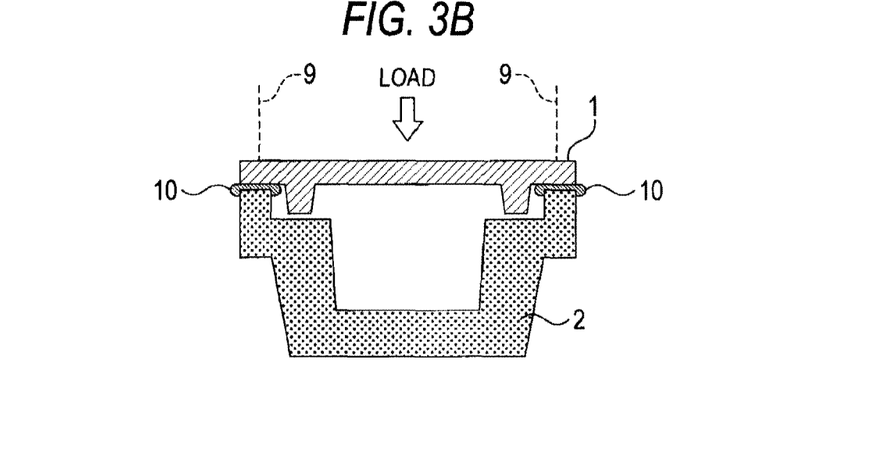
Figure 3C:
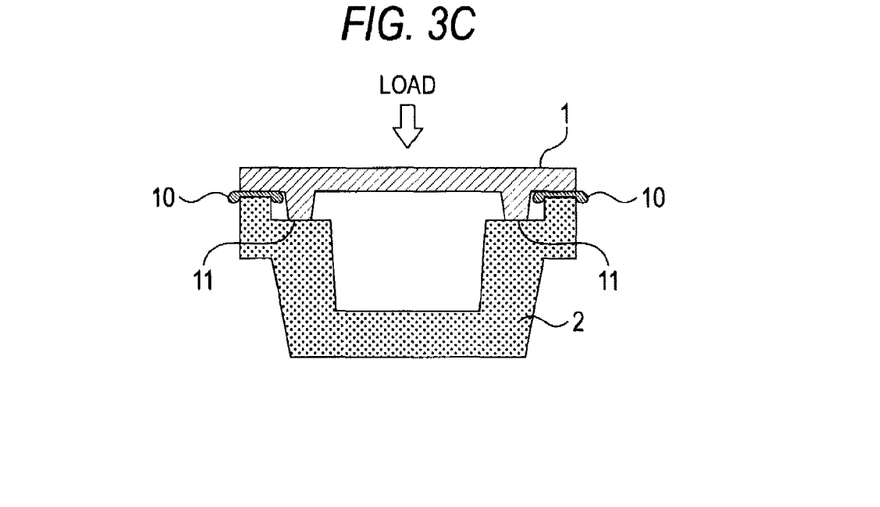
Figure 4:
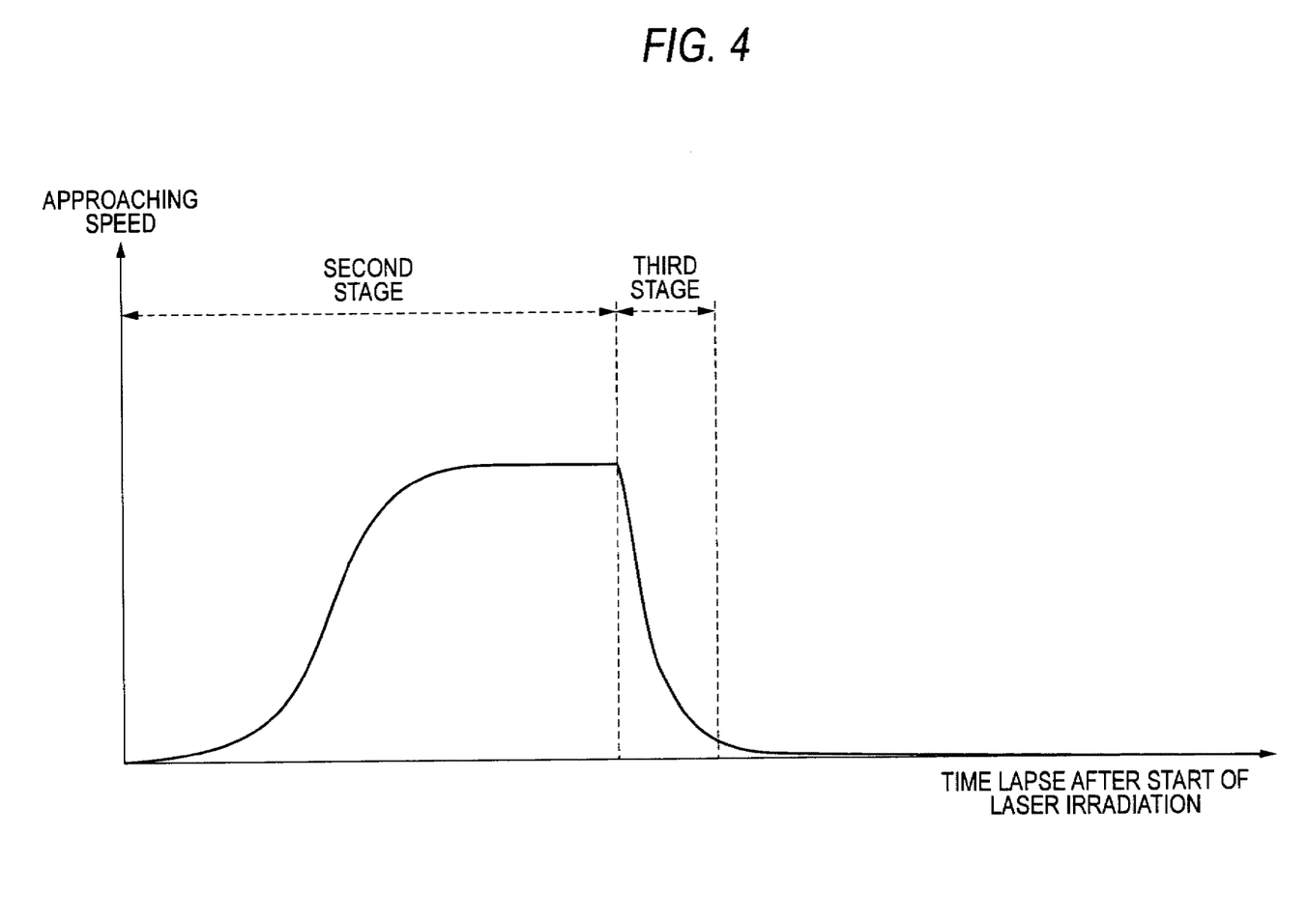
FIG. 4 is an explanatory view showing an example of change in approaching speed with time, occurring in welding according to the first embodiment of the invention.

FIG. 3A to FIG. 3C are sectional views showing the welding state of each stage in the welding method according to the first embodiment of the invention. FIG. 4 shows an example of change with time in the approaching speed of the two resin members 1 and 2 from the start of laser irradiation.

In the first stage shown in FIG. 3A, the resin member 1 and the resin member 2 are superimposed and a load is applied thereto. In this stage, the load mainly acts on a welded part 8.

In the second stage shown in FIG. 3B, a laser beam 9 is transmitted through the resin member 1 and cast onto the welded part 8. The technique of casting the laser beam 9 is not particularly specified. For example, a technique of causing a laser beam condensed in a spot to sequentially scan the welded part 8, a technique of casing a laser beam formed in a shape following the welded part 8 by using an optical device or mask, to the junction part at a time, or the like can be used.

The laser light source of the laser irradiation device 3 is not particularly specified, either. A diode laser having a near-infrared wavelength that can be transmitted through many types of resin, or a YAG laser is preferable. Moreover, a $CO_2$ laser or the like can be chosen.

At the same time as the start of irradiation with the laser beam 9, the speed measuring unit 6 starts measuring the approaching speed of the two resin members 1 and 2. When a predetermined time has passed after irradiation with the laser beam is started, a melted layer 10 is formed in the welded part 8. After that, as a part of the melted layer 10 is extruded out of the welded part, the resin member 1 and the resin member 2 approach each other. Since the approaching movement hardly proceeds until the melted layer 10 is formed, the approaching speed is low immediately after irradiation with the laser beam. However, once the melted layer is formed, it is sequentially extruded and therefore a substantially constant approaching speed is achieved. The approaching speed is as shown in FIG. 4.

In the third stage shown in FIG. 3C, the two resin members 1 and 2 are butted against each other at a butting part 11 provided in an area different from the welded part. Along with this, the approaching speed is suddenly reduced, as shown in FIG. 4. When the control unit 7 has detected this reduction in the approaching speed, the control unit 7 instructs the laser irradiation device 3 to end laser irradiation, and the laser irradiation is ended. The determination system in terms of control to detect the sudden reduction in the approaching speed is not particularly specified. However, the easiest way is to determine that the approaching speed is lowered below a predetermined threshold.

Figure 6:
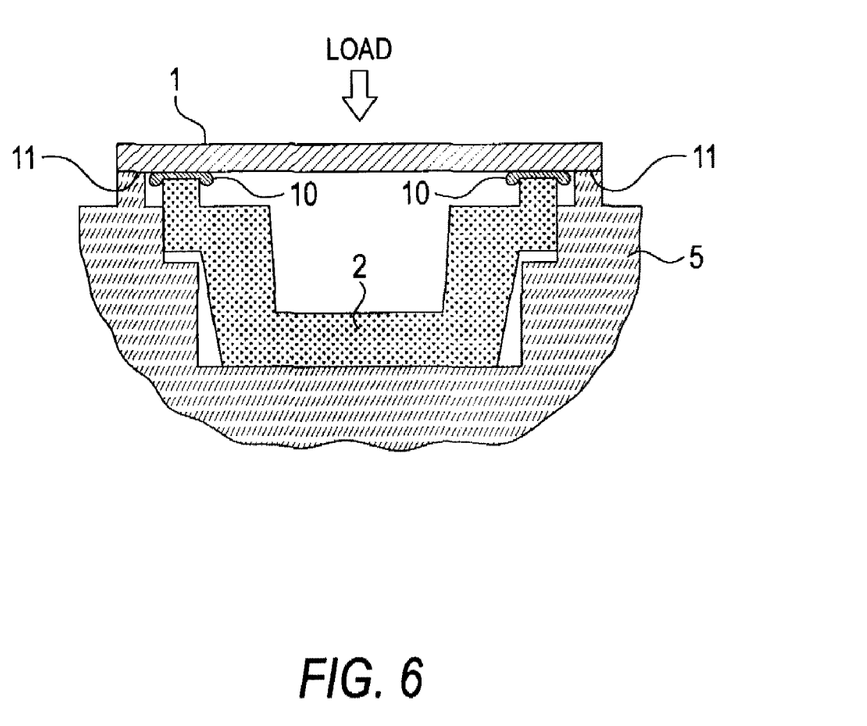
FIG. 6 is a sectional view showing still another exemplary method of butting resin members against each other.

In the above-described case, the butting part is provided on the two resin members. However, the butting part 11 may be provided between the resin member 1 and the holding jig 5 as shown in FIG. 5, or may be provided between the holding jig 4 and the holding jig 5 as shown in FIG. 6. Of course, the butting part 11 may also be provided between the holding jig 4 and the resin member 2. In this way, excessive laser irradiation after the resin members are butted against each other can be prevented, and reduction in joining strength due to excessive temperature rise in the melted layer can be prevented.

Figure 7:
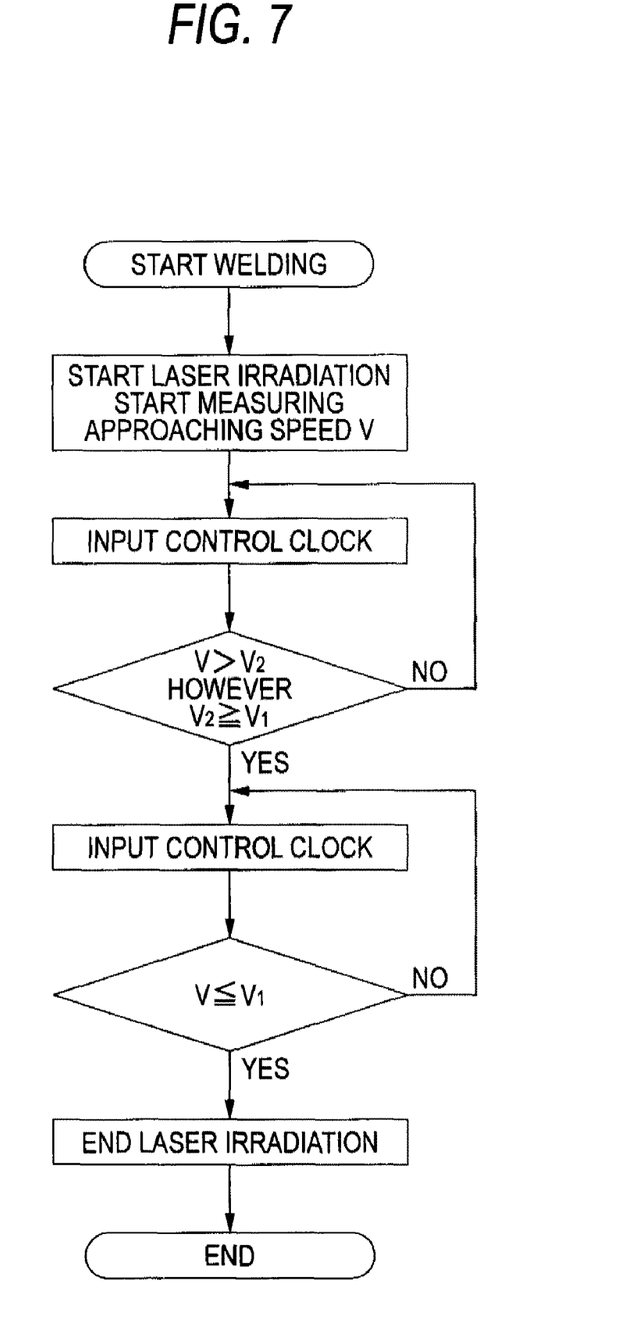
FIG. 7 is a flowchart showing an exemplary processing procedure in a control method according to the first embodiment of the invention.

FIG. 7 is a flowchart showing an exemplary processing procedure in the control method according to the first embodiment. First, when the approaching speed between the two resin members 1 and 2 is suddenly lowered, a first speed $V_1$ which is necessarily reached irrespective of difference among individual units is defined as a first threshold. Moreover, a second speed $V_2$ which is equal to or higher than the first speed $V_1$ and is necessarily reached irrespective of difference among individual units is defined as a second threshold.

After laser irradiation is started, first, whether the approaching speed V is higher or lower than the second threshold $V_2$ is determined at every time interval defined by the control clock. After a determination condition $V>V_2$ is satisfied, whether the approaching speed V is higher or lower than the first threshold $V_1$ is determined at every time interval defined by the control clock. When a determination condition $V \leq V_1$ is satisfied, it is determined that the approaching speed V is suddenly lowered, and the laser irradiation is ended.

In the determination according to the determination condition $V>V_2$, if the lapsed time after the laser irradiation is started is known in advance where this condition is satisfied, this lapsed time may be used instead.

Second Embodiment

Figure 8:
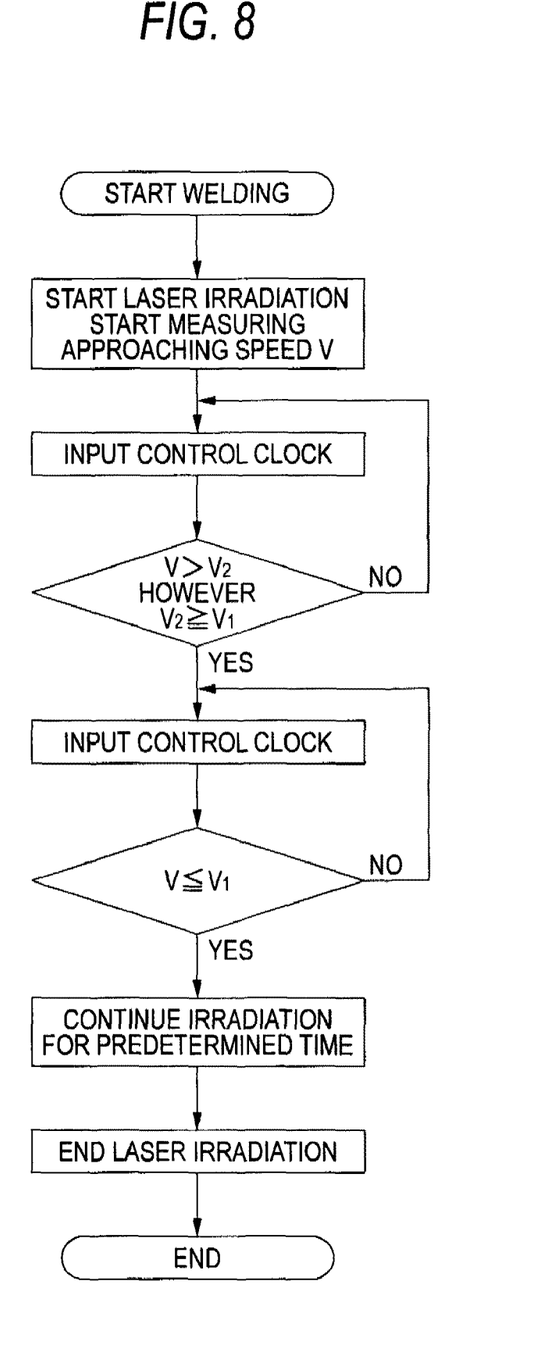
FIG. 8 is a flowchart showing an exemplary processing procedure in a control method according to the second embodiment of the invention.

FIG. 8 is a flowchart showing an exemplary processing procedure in the control method according to the second embodiment. In the second embodiment, lowering of the approaching speed V is determined when the determination condition $V \leq V_1$ is satisfied. Then, after laser irradiation is continued for a predetermined time, the laser irradiation is ended. The duration of this continued laser irradiation is set within a range shorter than the time range in which generation of voids or thermal decomposition occurs in the welded part 8. In this way, the melted layer 10 becomes thicker than in the case where laser irradiation is stopped immediately. Therefore, stronger junction can be achieved.

Third Embodiment

Figure 9:
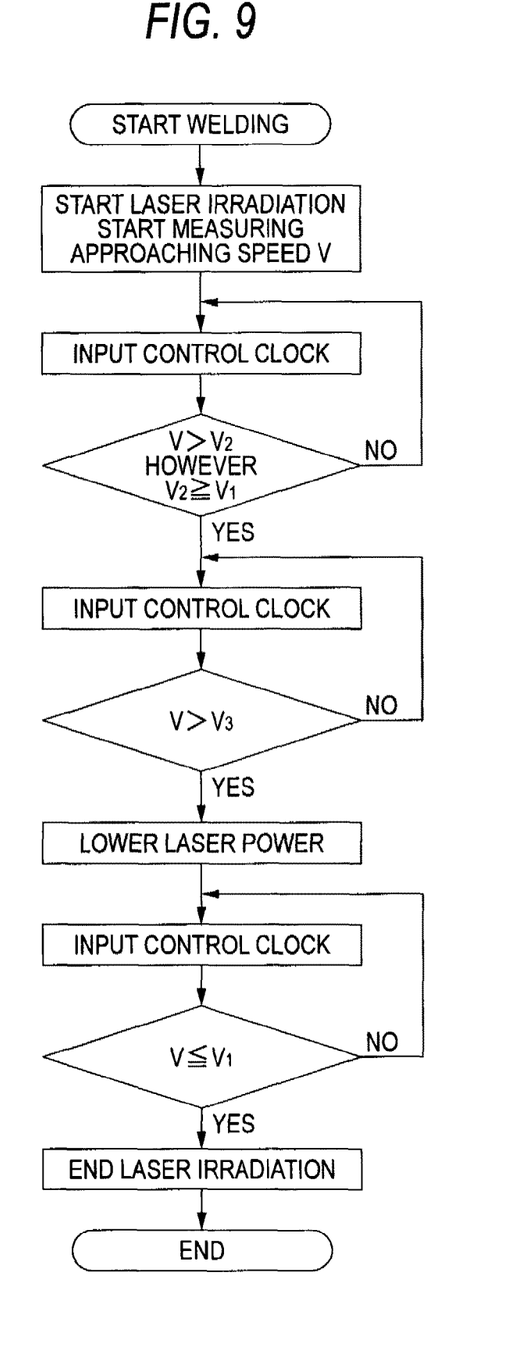
FIG. 9 is a flowchart showing an exemplary processing procedure in a control method according to the third embodiment of the invention.
Figure 10:
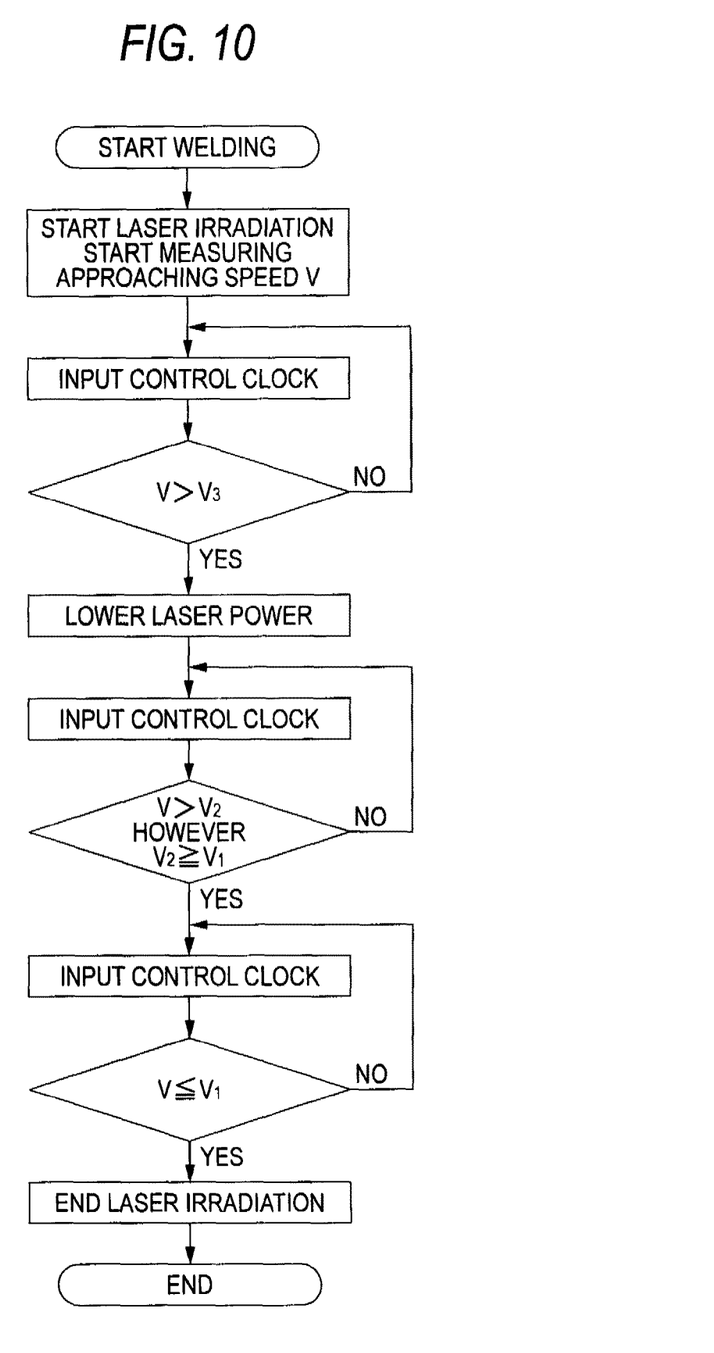
FIG. 10 is a flowchart showing another exemplary processing procedure in the control method according to the third embodiment of the invention.

FIG. 9 and FIG. 10 are flowcharts showing different exemplary processing procedures in the control method according to the third embodiment. In the third embodiment, the power of the laser beam cast onto the welded part 8 is lowered at a halfway point in the second stage of the first embodiment. A third speed $V_3$ at which the power of the laser beam is lowered is defined as a third threshold.

In FIG. 9, after the determination condition $V>V_2$ is satisfied, whether the approaching speed V is higher or lower than the third threshold $V_3$ is determined at each time interval defined by the control clock. After the power of the laser beam is lowered when the determination condition $V>V_3$ is satisfied, determination according to the first threshold $V_1$ is made.

FIG. 10 shows an example in the case where the third threshold $V_3$ is equal to or lower than the second threshold $V_2$. First, whether the approaching speed V is higher or lower than the third threshold $V_3$ is determined at each time interval defined by the control clock. The power of the laser beam is lowered in the stage where the determination condition $V>V_3$ is satisfied. After that, determination according to the second threshold $V_2$ and the first threshold $V_1$ is sequentially made.

The timing of lowering the laser beam power can be arbitrarily set as long as it is before the resin member 1 is butted against the resin member 2 and the approaching speed is suddenly lowered. Any of timing after the lapse of a predetermined time from the start of irradiation with the laser beam, timing after the two resin members 1 and 2 have approached each other by a predetermined amount, and timing after the approaching speed of the two resin members 1 and 2 has reached a predetermined speed, may be employed.

According to the third embodiment, the temperature rise in the melted layer 10 after the resin member 1 is butted against the resin member 2 becomes gentler. The grace period expands, which is from the time when a sudden reduction in the approaching speed is detected in the third stage until the laser irradiation is ended.

As a result, control becomes easier and the welding time can be reduced, compared to the case where irradiation is continued with low power from the start of laser irradiation.

In the above embodiments, the sealed container is used as an example of the welding target. However, the welding target is not limited to this.

Since high dimensional accuracy of the welded unit can be achieved according to the invention, the invention is suitable for manufacturing a housing case or the like of a high-precision electronic component.

Various modifications and alterations of this invention will be apparent to those skilled in the art without departing from the scope and spirit of this invention, and it should be understood that this is not limited to the illustrative embodiments set forth herein.

What is claimed is:

1. A resin member welding method comprising:
   superimposing a resin member having a laser-transmitting property and a resin member having laser absorptiveness,
   irradiating the resin members with a laser beam from the side of the laser-transmitting resin member to deposit the resin members on each other,
   measuring the speed of one resin member or a holding jig holding the one resin member with respect to the other resin member during the irradiation with the laser beam, and
   determining a reduction in approaching speed of the two resin members in accordance with the measured speed,
      wherein the irradiation with the laser beam is ended in accordance with reduction in approaching speed of the two resin members that is determined during the irradiation with the laser beam.

2. The resin member welding method according to claim 1, wherein reduction in the approaching speed of the two resin members due to butting of the two resin members against each other, or butting of holding jigs holding the two resin members against each other, or butting of a holding jig holding one resin member and the other resin member against each other, is determined during the irradiation with the laser beam and the irradiation with the laser beam is ended.

3. The resin member welding method according to claim 1, wherein the irradiation with the laser beam is ended after the lapse of a predetermined time after reduction in the approaching speed has occurred.

4. The resin member welding method according to claim 1, wherein power of the laser beam is lowered before reduction in the approaching speed occurs, which triggers the irradiation with the laser beam to be ended.

5. A resin member welding apparatus in which a resin member having a laser-transmitting property and a resin member having laser absorptiveness are superimposed and the resin members are irradiated with a laser beam from the side of the laser-transmitting resin member to deposit the resin members on each other, the apparatus comprising
- a speed measuring unit which measures the speed of one resin member or a holding jig holding the one resin member with respect to the other resin member during the irradiation with the laser beam, and
- a control unit which determines reduction in approaching speed of the two resin members in accordance with a measured value from the speed measuring unit and ends the irradiation with the laser beam.

6. The resin member welding apparatus according to claim 5, wherein the control unit determines reduction in the approaching speed of the two resin members due to butting of the two resin members against each other, or butting of holding jigs holding the two resin members against each other, or butting of a holding jig holding one resin member and the other resin member against each other during the irradiation with the laser beam, and ends the irradiation with the laser beam.

7. The resin member welding apparatus according to claim 5, wherein the irradiation with the laser beam is ended after the lapse of a predetermined time after reduction in the approaching speed has occurred.

8. The resin member welding apparatus according to 5, wherein the control unit lowers power of the laser beam at timing after the lapse of a predetermined time from when the irradiation with the laser beam is started, after the two resin members have approached each other by a predetermined amount, or after the approaching speed of the two resin members has reached a predetermined speed.

* * * * *